| United States Patent [19] | [11] 3,959,118 |
| Granquist | [45] May 25, 1976 |

[54] HYDROCARBON CRACKING WITH SYNTHETIC SMECTITE COMPOSITIONS

[75] Inventor: William T. Granquist, Houston, Tex.

[73] Assignee: N L Industries, Inc., New York, N.Y.

[22] Filed: Dec. 10, 1974

[21] Appl. No.: 531,366

Related U.S. Application Data

[63] Continuation of Ser. No. 257,303, May 26, 1972, Pat. No. 3,855,147.

[52] U.S. Cl. ............................... 208/120; 208/116; 252/441
[51] Int. Cl.² ...................... B01J 8/24; C10G 11/02
[58] Field of Search ........................... 208/120, 116

[56] References Cited
UNITED STATES PATENTS

| 3,252,889 | 5/1966 | Capell et al. ................... 208/120 |
| 3,803,026 | 4/1974 | Jaffe ................................. 208/111 |
| 3,804,741 | 4/1974 | Robson ............................ 208/110 |
| 3,838,041 | 9/1974 | Sawyer et al. .................. 208/120 |
| 3,844,979 | 10/1974 | Hickson ......................... 252/455 R |
| 3,887,454 | 6/1975 | Hickson ......................... 208/111 |
| 3,892,655 | 7/1975 | Hickson ......................... 208/111 |

*Primary Examiner*—Delbert E. Gantz
*Assistant Examiner*—G. E. Schmitkons
*Attorney, Agent, or Firm*—Delmar H. Larsen; Roy F. House; Robert L. Lehman

[57] ABSTRACT

Hydrocarbon cracking is carried out by means of a catalyst which is a novel synthetic smectite composition related to saponite plus accessory hydrous magnesia. The composition is calcined prior to use as a catalyst.

4 Claims, No Drawings

HYDROCARBON CRACKING WITH SYNTHETIC SMECTITE COMPOSITIONS

RELATED APPLICATION

This application is a continuation of copending application Ser. No. 257,303, filed May 26, 1972, now U.S. Pat. No. 3,855,147.

SUMMARY OF INVENTION

This invention relates to synthetic magnesian aluminosilicates, and more particularly to saponite-like compositions including accessory magnesium oxide and/or hydroxide, and still more particularly to highly swelling products obtained in accordance with the invention.

Among clays generally, a special group of clay types exists, which are characterized by swelling behavior in water. This group is in contrast to the clays used for thousands of years for ceramic purposes, in which swelling is a disadvantage since it leads to excessive shrinkage in the production of ceramic articles. This swelling group is characterized by a flat crystal habit in which the equlibrium distance between the individual flat crystallites is dependent upon the water content as well as other influences such as the electrolyte content of the water in contact with the clay. The term "smectite" has been revived in recent years to embrace the so-called montmorillonite group of clays which includes such well known members as montmorillonite, beidellite, nontronite, saponite, hectorite, and sauconite. A discussion and further details on smectites may be found in the book "Rock Forming Minerals", Volume 3, Sheet Silicates, by W. A. Deer et al., London 1962, pages 226–245.

Of the smectites, montmorillonite has been widely employed since about the turn of the century in the form of naturally occurring bentonite, for those properties which it possesses as a result of its ability to swell and gel in water. Another member of the group, hectorite, has been employed as widely as its relative rare occurrence permits, for many of the same uses as for montmorillonite, in which it generally is preferable because of its greater swelling behavior and white color. Because the smectites have inherently negatively charged crystal lattices and therefore have charge-balancing cations in positions subject to exchange by other cations, an entire technology has arisen in the past 25 years or so in which organic cations are employed exchanged upon smectites, particularly montmorillonite and hectorite, to obtain products which are swellable in organic solvents, the so-called organophilic bentonites and organophilic hectorites.

With the high and varied utility of the smectites, it is not surprising that some of them have been successfully synthesized on a commercial scale, particularly hectorite. For some uses the considerably higher cost of the synthetic products as compared with the natural is not a bar to their economic useage.

One disadvantage possessed by smectites generally is that their ability to swell in water is sharply reduced by the presence of electrolytes dissolved therein. Typical results showing the effect of various electrolytes such as sodium chloride, magnesium sulfate, and others, may be found in the classical paper, "The Swelling of Bentonite and Its Control" by C. W. Davis, Industrial and Engineering Chemistry 19, 1350–1352 (1927).

An object of the present invention is to provide a novel product and a process for producing the said product, which is a smectite composition akin to saponite containing intimately admixed and secluded hydrous magnesium oxide, the said products having extraordinary swelling behavior in water and in aqueous electrolyte solutions, and having wide utility generally.

Other objects of the invention will appear as the description thereof proceeds.

Generally speaking, and in accordance with illustrative embodiments of the invention, I provide a saponite-like mineral composition having the following formula per unit cell:

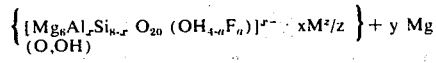

and in which the contents of the braces constitutes the unit cell of the saponite-like mineral and $y$ Mg (O,OH) is the variable amount of the accessory phase occluded therewith and which as the formula indicates is magnesium oxide or magnesium hydroxide or any of the hydrous magnesium oxide species and mixtures thereof intermediate between those two end members. The compositional variables, $x$, $y$, and $a$, may assume any value within the following limits:

$$0.1 \leq x \leq 1.5$$
$$0.1 \leq y \leq 2$$
$$0 \leq a \leq 2$$

with the preferred values being close to $x$ equals 0.5, $y$ equals 1, and $a$ equals zero. M is the charge-balancing cation, as explained hereinbelow, having a valence of $z$, and is most conveniently and preferably sodium ion, but may also be any other alkali metal or alkaline earth metal cation or ammonium ion or substituted ammonium ion, such as tetraethyl ammonium; or mixtures thereof. It will be clear that if a mixture is present in which the ions M have different valences, then $z$ will be an average value for the mixture. Further, the contents of the square brackets represents the fixed lattice portion of the unit cell, which as will be seen from totalling up the positive and negative charges of the ions contained in this lattice and shown in the square brackets, is negative. The charge-balancing positive charges are shown, outside of the square brackets but within the braces and as will be seen from the above formulation, these chargebalancing cations are represented by M. Furthermore, the hydrous magnesium oxide accessory phase, as will be explained in more detail hereinbelow, is not merely admixed with a previously formed saponite-like phase, but is present in the synthesis reaction mixture so that it is present at the time the crystal lattice within the square brackets is formed, and is thus intimately associated therewith, for which the term occluded therewith is fitting.

In order to prepare the novel products in accordance with the invention, an aqueous reaction mixture in the form of an aqueous slurry is prepared containing mixed hydrous oxides of silicon, aluminum, and magnesium, and sodium (or alternate cation or mixture thereof) hydroxide with or without, as the case may be, sodium (or alternate cation or mixture thereof) fluoride in the proportions defined by the above formula and the preselected values of $x$, $y$, and $a$ for the particular product desired. Optionally, but preferably, the slurry is allowed to age for at least 8 hours at room temperature after having been formed. The slurry is then placed in an autoclave and heated under autogenous pressure to a temperature within the range of approximately 100°C. to 325°C. and preferably about 300°C. for a sufficient period of time for the inventive product to form by the hydrothermal synthesis thus brought about. Formation times of three to five hours are typical, and the optimum time for a given preparation can readily be determined by pilot trials. After the synthesis is complete, then the autoclave and contents are permitted to cool to room temperature and the contents removed. In general, no washing of the product is necessary, but the entire contents may simply be spray dried or otherwise dried and ground if desired.

When a is selected to be zero, so that fluorides are not present, a convenient way to add the required amounts of alumina and sodium hydroxide is in the form of sodium aluminate, $NaAlO_2$. This results in the number of aluminum ions added to the system being accompanied by the same number of sodium ions, which I find preferable. However, satisfactory products are likewise obtained when the number of aluminum ions exceeds the number of sodium ions or equivalent selected cation or mixture of cations, such as potassium, lithium, calcium, ammonium, and the like.

Some specific examples will now be given, together with a tabulation of some of the properties of the products obtained.

EXAMPLE I

To A pounds of $SiO_2$, as a polysilicic acid sol prepared from Na-silicate solution by the teachings of U.S. Pat. No. 3,649,556, were added a solution of B pounds of sodium aluminate ($Na_2O \cdot Al_2O_3 \cdot 3 H_2O$) dissolved in a minimum amount of water, and C pounds of calcined magnesite (assaying 92.7% MgO) as a slurry prepared by shearing the MgO with water on a Cowles Dissolver. The amount of water was adjusted to give 7% solids and this feed slurry was aged in the feed mix tank, with stirring, for 20 hours. After such aging, the slurry was diluted to 4% solids and then pumped to a 140-gallon autoclave. Hydrothermal treatment was at 300°C. and 1240 psig for 4 hours; the time for the autoclave to be heated from room temperature to 300°C. was 12½ hours. The product slurry was discharged from the autoclave through a quench condenser and then spray-dried.

For several runs, the values of A, B, and C, and of the parameters $x$, $y$, and $a$ are given in Table 1.

Table 1

| Sample | A | B | C | x | y | a |
|---|---|---|---|---|---|---|
| 1-1 | 20 | 11.58 | 2.42 | 0.5 | 0 | 0 |
| 1-2 | 15 | 9.41 | 1.81 | 0.5 | 0.5 | 0 |
| 1-3 | 13.2 | 8.92 | 1.60 | 0.5 | 1.0 | 0 |
| 1-4 | 13.2 | 9.57 | 1.60 | 0.5 | 1.5 | 0 |

Some rheological properties of 2.5% (dry basis) dispersions in water and in salt solution of the products described in Table 1 are listed in Table 2. The viscometer used was a Fann V-G meter (See Savins, U.S. Pat. No. 2,703,006 for design and theory).

Table 2

| Sample | y | Plastic Vis., cp. 24 hr. | | Yield Strength, lb/100 ft² | |
|---|---|---|---|---|---|
| | | Dist. H₂O | Sat. NaCl soln. | Dist. H₂O | Sat. NaCl soln. |
| 1-1 | 0 | 2 | 2 | 0.5 | 0 |
| 1-2 | 0.5 | 1.5 | 7.5 | 4.5 | 3.5 |
| 1-3 | 1.0 | 1.5 | 8.0 | 9.0 | 36.5 |
| 1-4 | 1.5 | 2.0 | 2.5 | 8.5 | 15.0 |

Note that when y equals zero, unsatisfactory rheological properties are obtained, and indeed, this preparation (Sample 1—1) is outside the scope of the invention.

EXAMPLE II

Plant-scale synthesis was accomplished from a polysilicic acid sol as described in Example I, hammer-milled calcined magnesite, alumina trihydrate, and liquid caustic (50% NaOH). The magnesite was sheared in tap water by means of a Cowles Dissolver, and the resulting slurry added with agitation to the polysilicic acid sol. The proper amounts of alumina trihydrate and caustic were then added, again with agitation. The feed slurry thus prepared was aged about 48 hours (over a weekend), then diluted with water to 4% solids. The feed composition thus obtained can be described by the following molar ratios:

$SiO_2/MgO = 1.088$;  $SiO_2/Al_2O_3 = 19.7$;  $SiO_2/NaOH = 15.0$;

the pH was 10.25. It will be noted from these ratios that the composition contained some excess alumina.

The feed was pumped into an autoclave through a preheater, and attained in this way a temperature of 150°C. at entry to the autoclave. In the autoclave the temperature was increased to 300°C. and the pressure correspondingly increased to 1240 psig. The autoclave was maintained at these latter conditions for 3 to 4 hours and then discharged through a quench condenser. The product slurry was spray-dried.

The product so obtained had the properties listed in Table 3.

Table 3

| A: General Properties | |
|---|---|
| Moisture, 105°C. % | 8.99 |
| Ignition Loss, 900°C., % (dry basis) | 8.97 |
| Bulk density, lb/ft³ | |
| Uncompacted | 61.5 |
| Compacted | 68.6 |
| Cation exchange capacity, meq/100 gm | |
| NH₄ AC method | 56 |
| Methylene blue method | 80 |
| Calculated from composition | 65 |
| Oil absorption, ASTM C.281-31, lb/100 lb | 50 |
| pH value (4% solids in water) | 10 |

Table 4

B. Viscosity Data (Fresh Water), 3.3% solids, Fann V-G meter

| | Shear Stress (dial deflection) | |
|---|---|---|
| Shear Rate, rpm | Initial | 24 hour |
| 600 | 30 | 38 |
| 300 | 28 | 33 |
| 200 | 26 | 31 |
| 100 | 24 | 29 |
| 6 | 20 | 22 |
| 3 | 20 | 22 |

| | Initial | 24 hour |
|---|---|---|
| Plastic viscosity, centipoise | 2 | 5 |
| Yield point, lb/100 ft² | 26 | 28 |

Table 4-continued

| | | |
|---|---|---|
| 10 sec. gel strength, lb/100 ft$^2$ | 42 | 38 |
| 10 min. gel strength, lb/100 ft$^2$ | 102 | 75 |

Table 5

C. Viscosity Data (Electrolyte Solutions), Initial Test, Fann V-C meter

| Fluid | %Solids | Plastic Viscosity,cp | Yield Point | 10 sec. Gel Strength lb/100 Ft$^2$ | 10 min. Gel Strength |
|---|---|---|---|---|---|
| Fresh water | 3 | 2 | 26 | 42 | 102 |
| Sea water | 6 | 7 | 41 | 37 | 55 |
| Sat. NaCl | 3.85 | 7 | 40 | 34 | 45 |
| Sat. CaCl$_2$ | 3.85 | 10 | 29 | 19 | 28 |
| 1N NaOH | 4 | 5 | 10 | 9 | 10 |

The data in Tables 4 and 5 establish the unique gelling properties of this synthetic product. The plastic viscosity is low but the gel strength and yield point are high for a variety of suspending fluids. It is apparent from these rheological data that this product is a useful gellant for fluids as varied as fresh water, sea water, saturated sodium chloride and calcium chloride solutions, and 1N NaOH.

The data on cation exchange capacity in Table 3 include the methylene blue method result, although this is not reliable in this instance. The agreement between the calculated figure and the ammonium acetate determination is satisfactory.

EXAMPLE III

Another sample of product made as described for Example II was converted to the ammonium form by repeated leaching with ammonium acetate solution. It was washed, and calcined at 700°C. for four hours. Its ability to crack cumene was determined by saturating helium with cumene at 55°C. and then passing it over a 0.25 g sample of the calcined material, ground to 30/60 mesh. The reactor temperature was 350°C., and the flow rate was 1 cc per second. After one hour of continuous flow, a sampling of the output showed a conversion rate of 59.3% of the cumene to propylene and benzene.

The calcined product had a specific surface area of 307 square meters per gram, as determined by the Brunauer-Emmett-Teller method using nitrogen as the adsorbate.

EXAMPLE IV 81.2 g of hammermilled calcined magnesite assaying 92.7% MgO were added to water and sheared in a laboratory mixer (a Cowles Dissolver) to obtain good dispersion of the particles. This slurry was added with agitation to 120 g of silica in the form of a polysilicic acid sol containing 5.7% SiO$_2$. To this mixture there were added with stirring 10.5 g of alumina trihydrate (64.9% Al$_2$O$_3$), and 11.5 g of NaF which had been dissolved in a minimum of water. The volume at this stage was 2.2 liters, all of which was charged into a one-gallon stirred autoclave. The autoclave and contents were heated to 300°C. at which temperature the pressure was 1240 psi gage. The heating time to final temperature was one hour, 45 minutes. The autoclave was maintained at 300°C. for four hours. The vessel was then cooled, the product slurry removed, dried at 105°C., and ground. X-ray diffraction indicated good crystallinity with MgO as the only accessory phase. The unit cell formula for the product was approximately as follows:

$$\{Mg_6\ Si_{7.5}\ Al_{0.5}\ O_{20}\ (OH)_3\ F\cdot 0.5\ Na\} + 1\ MgO$$

The solids content of the slurry when placed into the autoclave is not critical. Less than about 2% solids is wasteful from the standpoint of heating losses and throughput for a given piece of equipment, and in addition, synthesis times may be somewhat prolonged. On the other hand, greater than about 10% solids generally results in a slurry which cannot conveniently be handled by ordinary equipment. I prefer from about 3% to about 5% solids in the slurry, as illustrated in the examples given.

The inventive products, as already indicated, have wide utility. Particularly in the case of those inventive products in which M is univalent, and more particularly when M is largely sodium or lithium or a mixture thereof, the ability to spontaneously disperse and swell in water makes them useful for drilling mud additives; as thickeners and thixotropy imparting agents for water base paints; as thickeners and bodying agents for aqueous cosmetic preparations, dentifrices such as toothpaste, and the like. The large surface area developed upon dispersion in aqueous liquids makes them highly useful for the clarification of beer wine, vinegar, and honey. Their ability to coat paper with a thin adherent film makes them useful in the paper sizing art generally, and in particular their cation exchange capacity in combination with their surface catalytic properties especially for certain organic amines renders them especially useful in those copying papers wherein pressure releases microencapsulated color-forming agents, as set forth, for example, in British Pat. No. 773,180.

The cation-exchange capacity also makes possible the conversion of the inventive products to organophilic smectites, for which the general procedures set forth in Hauser U.S. Pat. No. 2,531,427, the contents of which are incorporated herein by reference, may be employed. Such organophilic smectites in turn have wide utility; they may be used in the formulation of lubricating greases, as set forth in Jordan U.S. Pat. No. 2,531,440; in paints, varnishes and printing inks, as set forth in Ratcliffe U.S. Pat. No. 2,622,987 and the like. The aforesaid Jordan and Ratcliffe patents are likewise incorporated herein by reference.

The inventive products have wide catalytic utility, such as for cracking hydrocarbons, for reforming hydrocarbons, in various organic reactions in which clay catalysts have heretofore been used, and as active carriers for other catalytic substances such as platinum, palladium, nickel, cobalt, molybdenum, copper, and other heavy metals, in their cationic, metallic, or oxide or sulfide or other combined form.

While my invention has been described with the aid of numerous specific examples, it will be recognized by those skilled in the art that many variations are possible without departing from the spirit and scope of the invention.

It will be clear from all of the foregoing, and in particular from the examples, that my synthetic mineral composition may be used with great advantage whenever it is desired to increase the consistency of an aqueous system, including compositions generally having an aqueous phase. The increase in consistency may be followed by any of the known rheological methods, one of the simplest and most direct of which is the determination of the gel strength. The consistency-increasing properties of my inventive products are especially marked in those in which the exchangeable cation is an alkali metal cation. In general, simple addition of the inventive product to the system suffices, followed when desired or indicated by stirring or like agitation.

Having described the invention, I claim:

1. The process of cracking hydrocarbons which includes the step of passing said hydrocarbons during said cracking process in the absence of added $H_2$ over a catalyst obtained by calcining a synthetic mineral composition having the following formula per unit cell:

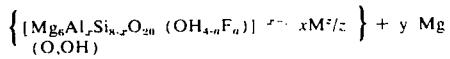

in which the contents of the braces constitutes said unit cell of a smectite and in which the contents of the square brackets represents the fixed lattice portion of the unit cell, said fixed lattice portion having a negative charge; and in which M represents cations balancing said negative charge, and wherein $z$ is the valence of said M, and in which said M is selected from the group of cations consisting of ammonium ions, substituted ammonium ions, and mixtures thereof; and in which $y$ Mg (O,OH) is an accessory phase occluded with said smectite and consisting of hydrous magnesium oxide selected from the class consisting of magnesium oxide, magnesium hydroxide, hydrous magnesium oxide species intermediate therebetween, and mixtures thereof; and in which said $x$, said $y$, said $z$, and said $a$ have values within the following ranges:

$$0.1 \leq x \leq 1.5$$
$$0.1 \leq y \leq 2$$
$$0 \leq a \leq 2$$
$$1 \leq z \leq 2.$$

2. The process in accordance with claim 1 wherein said mineral composition is calcined at about 700°C. prior to said cracking.

3. The process in accordance with claim 1 wherein said M is ammonium.

4. A process in accordance with claim 2 wherein said M is ammonium.